US008166172B2

(12) United States Patent
Brown et al.

(10) Patent No.: US 8,166,172 B2
(45) Date of Patent: Apr. 24, 2012

(54) REMOTE TERMINAL, PROCESSOR-READABLE MEDIUM, AND METHOD FOR REMOTE ADJUSTMENT OF A USER PROFILE

(75) Inventors: Carlton Ligar Brown, Danville, CA (US); G. Keith Cambron, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/045,286

(22) Filed: Mar. 10, 2011

(65) Prior Publication Data

US 2011/0158300 A1 Jun. 30, 2011

Related U.S. Application Data

(63) Continuation of application No. 11/403,699, filed on Apr. 13, 2006, now Pat. No. 7,930,399, which is a continuation of application No. 10/327,753, filed on Dec. 23, 2002, now Pat. No. 7,058,122.

(51) Int. Cl.
*G06F 15/173* (2006.01)
*G06F 15/16* (2006.01)

(52) U.S. Cl. ........ 709/226; 709/203; 709/228; 375/219; 375/220

(58) Field of Classification Search .......... 709/202–203, 709/225–228; 375/219–220
See application file for complete search history.

(56) References Cited

U.S. PATENT DOCUMENTS

| 4,956,852 A | 9/1990 | Hodge |
| 5,513,213 A | 4/1996 | Patel |
| 5,683,432 A | 11/1997 | Goedeke |
| 5,867,494 A | 2/1999 | Krishnaswamy |
| 6,151,335 A | 11/2000 | Ko |
| 6,163,599 A | 12/2000 | McHale |
| 6,219,378 B1 | 4/2001 | Wu |
| 6,246,695 B1 | 6/2001 | Seazholtz |
| 6,285,708 B1 | 9/2001 | Shively |
| 6,944,460 B2 * | 9/2005 | Haartsen ........................ 370/329 |
| 7,047,177 B1 * | 5/2006 | Lee et al. ...................... 709/226 |
| 7,058,122 B2 | 6/2006 | Brown |
| 2001/0030998 A1 | 10/2001 | Yong |
| 2002/0124050 A1 * | 9/2002 | Middeljans ................... 709/203 |
| 2003/0156691 A1 | 8/2003 | Rahamim |
| 2003/0190937 A1 | 10/2003 | Karmi |
| 2004/0230834 A1 * | 11/2004 | McCallam ................... 709/224 |

FOREIGN PATENT DOCUMENTS

| FR | 2697392 | 10/1992 |
| SU | 1363491 A1 | 12/1987 |

OTHER PUBLICATIONS

International Search Report for International Application No. PCT/US03/39920, Mailed on Aug. 24, 2004.
International Preliminary Examination Report for International Application No. PCT/US03/39920, Mailed on Mar. 10, 2005.

* cited by examiner

*Primary Examiner* — Bharat Barot
(74) *Attorney, Agent, or Firm* — Toler Law Group, PC

(57) ABSTRACT

A method includes receiving at least one performance parameters from a customer premises equipment at a controller. The method includes storing the at least one performance parameter for the customer premises equipment in a line table. The method includes determining a difference between each performance parameter and a corresponding performance standard for each performance parameter entry in the line table. The method includes adjusting a customer profile for the customer premises equipment when at least one difference indicates a violation. The method also includes removing from the line table each performance parameter entry associated with the at least one difference that indicates the violation.

20 Claims, 2 Drawing Sheets

REMOTE TERMINAL, PROCESSOR-READABLE MEDIUM, AND METHOD FOR REMOTE ADJUSTMENT OF A USER PROFILE

PRIORITY CLAIM

This application is a continuation of, and claims the benefit of, U.S. patent application Ser. No. 11/403,699, filed Apr. 13, 2006, now U.S. Pat. No. 7,930,399; which is a continuation of 10/327,753, now U.S. Pat. No. 7,058,122, filed Dec. 23, 2002; and the contents of both are expressly incorporated herein by reference in their entireties.

FIELD OF THE DISCLOSURE

The present disclosure relates generally to data transmission systems, and more particularly, to a method and system for adaptively and remotely adjusting a user profile.

BACKGROUND

Demand for high-speed data transmission is ever increasing. Internet access, electronic commerce, Internet protocol telephony, and videoconferencing are examples of some telecommunication-based medium that require such a demand.

Digital subscriber line (DSL) technology provides high-speed data transmission over a so-called "last mile" of "local loop" of a telephone network via twisted copper wire between residential and small business sites and telephone company central offices. There are various types of DSL such as asymmetric DSL, high bit-rate DSL, single-line DSL, very-high-data-rate DSL, integrated services digital network (ISDN) DSL, and rate-adaptive DSL having various transmission rates, switched circuit characteristics, and other known operation characteristics. These are collectively referred to as xDSL technologies.

In a simplified general view, a DSL system may be considered as a pair of communicating modems, one of which is located at a home or office computer, and the other of which is located at a network control site, typically at a telephone company central office. The central office modem is connected to some type of network, usually referred to as a backbone network, which is in communication with other communication paths by way of routers or digital subscriber line access multiplexers (DSLAMs). Through DSLAMs the backbone network is able to communicate with dedicated information sources and with the Internet. As a result, information accessible to the backbone network may be communicated between the central office modem and a customer site modem.

Typically, in order to install a new customer modem within a telephone network to a central office modem requires two truck rolls or technician visits to customer sites. A first truck roll is performed by a mass-market technician who validates a synchronous communication rate between the customer modem and the central office modem. A second truck roll is performed by a data communication technician who installs a splitter/microfilter and a customer premises equipment (CPE) or modem, and configures a customer's personal computer to have a designated customer profile. There is a desire to minimize the number of truck rolls to increase the number of modem installations possible within a specified time frame and to decrease costs involved in installation.

A customer profile or an xDSL service profile includes a customer modem communication rate with the central office. The central office provides an allowable communication rate for each customer, which is separate from and distinctly different than a customer capable communication rate. The customer capable communication rate is typically a modem rated communication rate, whereas the customer allowable transmission rate is set by the central office and may be manually adjusted as needed. The customer allowable transmission rate may be slower or faster than the customer capable communication rate.

Additionally, customer line instability upon initial startup has caused an increased number of truck rolls. A maximum allowable communication rate is initially provided to a customer line. As the customer line is in operation when instability occurs the customer allowable communication rate is manually reduced to account for the instability issues. The instability may be due to noise or undesired signal interference. An additional truck roll is performed for each instance that the customer allowable communication rate is reduced.

Furthermore, to modify a customer profile, similar to when post installation instability issues occur, an additional truck roll is required. When a customer site is experiencing frequent signal-to-noise errors, or is not operating at a preferred data transmission rate, a technician is then dispatched to the customer site to change the customer profile. A customer may also request the customer allowable transmission rate be changed when the customer notices the customer line frequently being out of synch or experiencing data transmission errors.

It would therefore be desirable to develop a DSL communication system that is capable of setting and adjusting customer profiles while at the same time minimizing the number of truck rolls and allowing more customers to have error-free service when initially connected.

DETAILED DESCRIPTION

Figure 1:
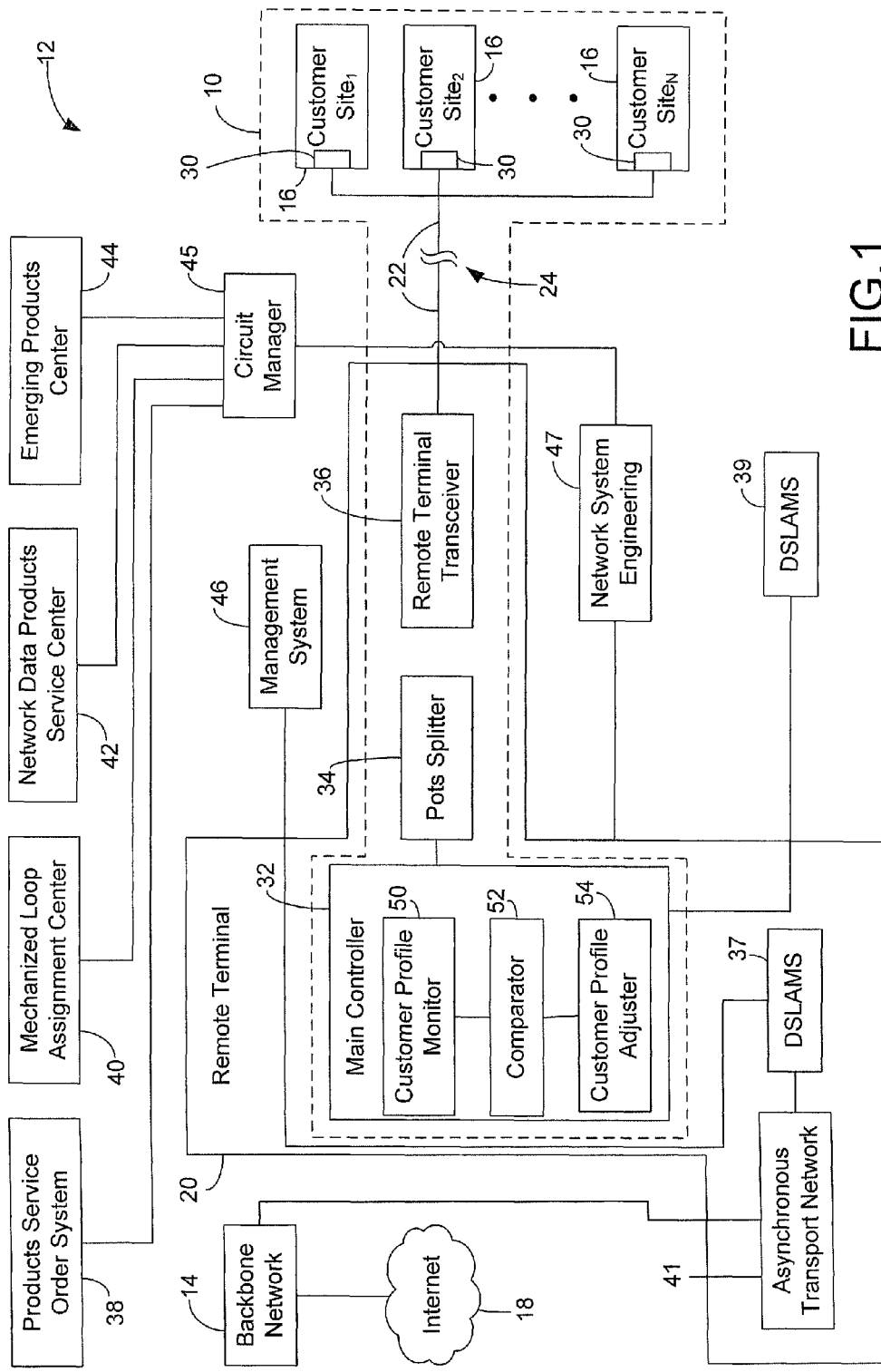
FIG. 1 is a remote customer profile adaptive operating system for use in a digital subscriber line telecommunication network in accordance with an embodiment of the present disclosure.

While the present disclosure is described with respect to a method and apparatus for adaptively and remotely adjusting a customer profile from a remote location, the present disclosure may be adapted to be used in various systems including: telecommunication systems, digital subscriber line (DSL) systems, high-speed data transmission systems, or other communication systems.

In the following description, various operating parameters and components are described for one constructed embodiment. These specific parameters and components are included as examples and are not meant to be limiting.

Also, in the following description the term "transceiver" generally refers to any communication transceiver or system containing a communication transceiver including a modem, a phone, a splitter in combination with a modem, a computer, a satellite, or other transceiver known in the art.

In a particular embodiment, the present disclosure provides a method and network for adaptively and remotely adjusting a customer profile from a remote location without human intervention. A remote customer profile adaptive operating system for use in a DSL telecommunication network is provided. The system includes a customer site and a remote terminal. The customer site has a customer profile and includes customer premises equipment that receives and transmits communication signals to the remote terminal. The remote terminal includes a remote terminal transceiver in communication with the customer premises equipment and a main controller electrically coupled to the remote terminal transceiver. The main controller includes a customer profile monitor that monitors at least one customer performance parameter. A comparator compares the customer performance parameters to at least one associated customer performance standard and generates a customer difference signal. A customer profile adjuster modifies the customer profile remotely in response to the customer difference signal.

One of several advantages of a particular embodiment of the present disclosure is that it provides an adaptive operating system for remotely adjusting customer profiles with no human intervention. In so doing, the particular embodiment of the present disclosure minimizes truck rolls in setting up a customer site and in further adjusting the customer profile, and allows the customer site to operate upon installation with minimum operating errors.

Another advantage of a particular embodiment of the present disclosure is that it efficiently provides a customer site with an allowable communication rate that is approximately equal to a communication rate for which a customer terminal ideally exhibits minimum signal-to-noise ratio, minimum attenuation, minimum errors, and maximum line capacity.

Furthermore, a particular embodiment of the present disclosure also provides continuous customer profile adjustment without traditional time delay associated with truck rolls and manual adjustment of a customer profile.

Other advantages and features of the present disclosure will become apparent when viewed in light of the following description when taken in conjunction with the attached drawings and appended claims.

Referring now to FIG. 1, a remote customer profile adaptive operating system 10 for use in a DSL telecommunication network 12 in accordance with an embodiment of the present disclosure is shown. The DSL network 12 includes a backbone network 14 and multiple customer sites 16. The DSL network 12 routes DSL communication signals between the backbone network 14 and the customer sites 16. The backbone network 14 may be electrically coupled to the Internet 18 and is electrically coupled to at least one remote terminal 20, which, in turn, is electrically coupled to the customer sites 16, via cables 22. The customer sites 16 may be long distances from the remote terminals 20, which is represented by break 24. The cables 22 may be twisted wire pair cable, fiber optic cable, or other cable known in the art.

The adaptive operating system 10 includes customer sites 16 having customer premises equipment 30, which may include a modem, a splitter, a network interface card, or other customer premises equipment known in the art. The customer premises equipment 30 is in communication with a main controller 32 of the remote terminal 20 via a pots splitter 34 and a remote terminal transceiver 36. The customer premises equipment 30 has an associated customer profile. The customer profile includes various customer performance parameters such as an operating code, a signal-to-noise ratio, a line capacity, an attenuation value, an error rate, and other performance parameters known in the art. The adaptive operating system 10 provides remote customer profile adjustment without the need for a truck roll.

The customer sites 16 may be residential or commercial sites. Each customer site 16 has an associated line that may be included in a line table. Each customer site may perform numerous associated customer events for a specified time period, which may be reviewed by accessing the customer site associated line in the line table. The line table contains customer site lines for which customer performance parameters are to be reviewed.

The remote terminals 20 may be central offices or other form of remote terminals known in the art. The remote terminals 20 may be located in a suburban/rural environment or may be located in a more urban environment. The remote terminals 20 may contain DSL access multiplexer (DSLAM) equipment 37, be electrically coupled to external DSLAMs 39, or a combination thereof, to provide DSL service. The DSLAMs 37 and 39 may be coupled to the backbone network 14 via an asynchronous transport network 41, as known in the art. The remote terminals 20 may be complex in that they have several service centers and systems or may be as simple as a single computer in a remote location.

In one embodiment of the present disclosure, the remote terminals 20 include the main controller 32, which is electrically coupled to an emerging products center 38, a mechanized loop assignment center 40, a network data products service center 42, and a product service order system 44, via a circuit manager 45. The main controller 32 is electrically coupled to a management system 46, via DSLAMs 37, and network system engineering 47. The management system 46 and network system engineering 47 are electrically coupled to the circuit manager 45. The main controller 32 is a regional device but may be at a single central office or remote terminal location. The circuit manager 45, the management system 46, network system engineering 47, the products center 38, the assignment center 40, the service center 42, and the order system 44 are also regional and may be at locations other than a central office or location of the remote terminal 20.

The main controller 32 includes a customer profile monitor 50, a comparator 52, and a customer profile adjuster 54 (all software based). The main controller 32 is preferably microprocessor-based such as a computer having a central processing unit, memory (RAM and/or ROM), and associated input and output buses. The main controller 32 may also be in the form of a workstation, such as, for example, a Sun Workstation. The main controller 32, the profile monitor 50, the comparator 52, and the customer profile adjuster 54 may be integrally part of a single unit, as shown, or may each be separate stand-alone devices. The main controller may also be electrically coupled to various DSLAMs and servers, as shown. The main controller 32 monitors the customer performance parameters over time and remotely adjusts the customer profiles accordingly. The functions of the profile monitor 50, the comparator 52, and the customer profile adjuster 54 are discussed in further detail below.

The management system 46 is a management system for the DSLAMs 37 and 39. The management system 46 may be an Alcatel management system or other management system known in the art. The management system 46 provides operating system provisioning, as known in the art.

The circuit manager 45 is a customer service manager containing customer information including customer site information and customer profiles. The circuit manager 45 limits provisioning and direct access on and to DSLAMs 37 and 39.

Network system engineering 47 reviews customer records for validity and reviews results from the main controller 32 for processing.

The products center 38 is a sales center that handles provisioning customer calls regarding a DSL product. When a customer inquiry is received, a service representative gathers necessary information for qualification and order processing and checks for product availability in the remote terminal 20. DSLAM port availability is checked for the remote terminal 20 and customer loop link is verified to be within a specified range from the remote terminal 20. The products center 38 receives customer information such as name and address and customer order information and initiates processing of the information. The products center 38 also receives customer guidelines for installation of the customer premises equipment 30.

The assignment center 40 is responsible for assigning facilities to provision a customer service. The assignment center 40 inventories and assigns remote facilities of the remote terminals 20.

The service center 42 provides technical channel setup to handle provisioning of data products. The service center 42 performs maintenance of DSLAM equipment and installation of DSL service.

The order system 44 interacts with various back end systems to verify that equipment is available to serve a specific customer location. Pre-ordering applications is enabled by a sales channel representative for xDSL service. The order system 44 verifies that equipment is in place to serve a customer at a specific location, collects preorder information from telephone company databases through telephone company preorder interfaces, and sends such information through other local exchange carrier systems in order to process a customer request for service.

Figure 2:
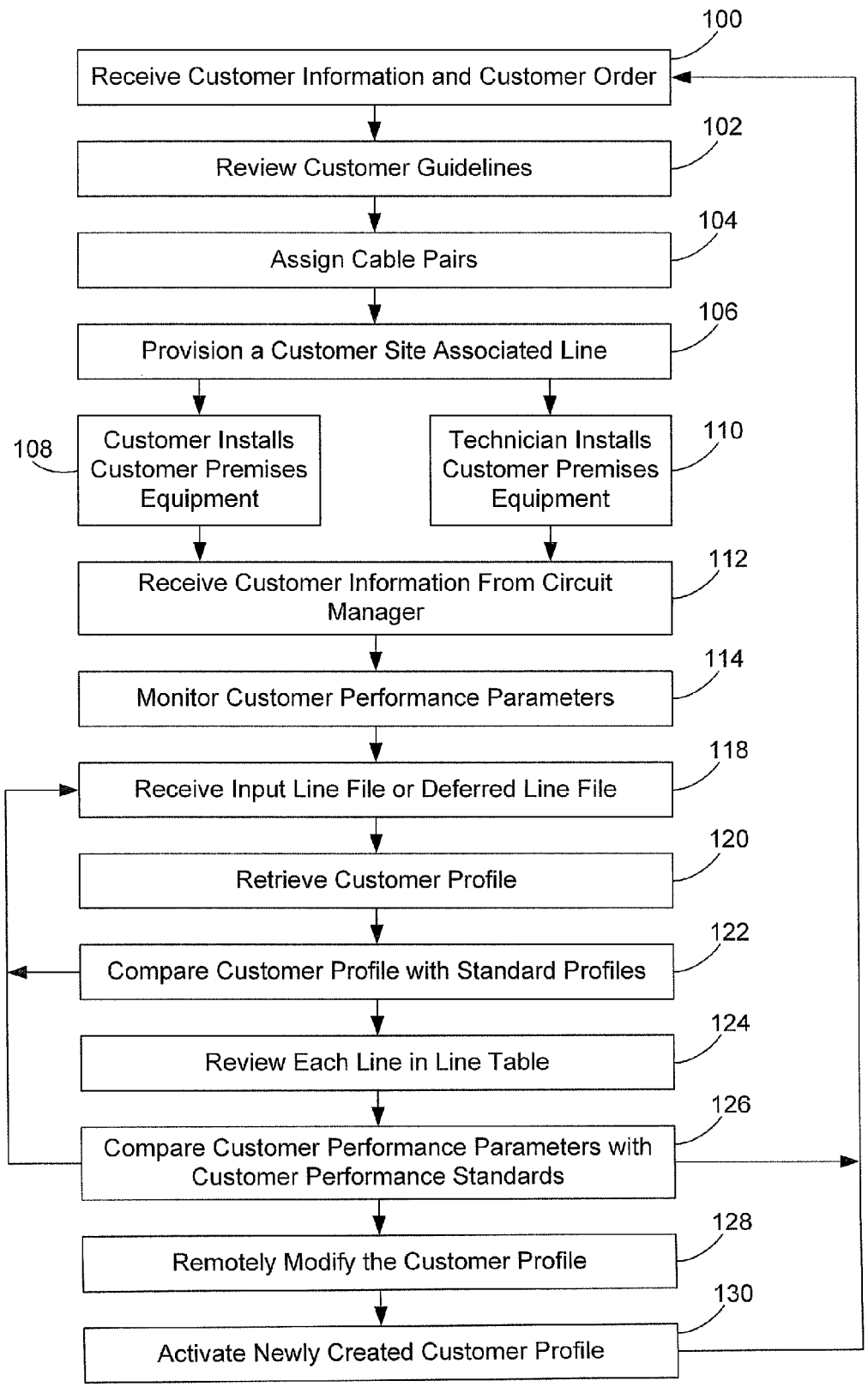
FIG. 2 is a logic flow diagram illustrating a method of adaptively and remotely adjusting a customer profile within a digital subscriber line telecommunication network in accordance with an embodiment of the present disclosure.

Referring now to FIG. 2, a logic flow diagram illustrating a method of adaptively adjusting a customer profile within the DSL telecommunication network 12 in accordance with an embodiment of the present disclosure is shown.

At step 100, the products center 38 receives customer information and a customer order as described above. A customer may be a current customer with an active account, a previous customer with an inactive account, or may be a new customer. An installation may be requested or an adjustment may be requested to a current customer profile, in either situation, customer guidelines are provided by the customer.

At step 102, the customer guidelines are reviewed and the adaptive operating system 10 determines whether the customer qualifies for a self-install. When the customer does qualify for a self-install, steps 104-108 are performed. When the customer does not qualify for a self-install; steps 104, 106, and 110 are performed.

In step 104, the assignment center 40 assigns cable pairs to a DSLAM to be associated with a customer site 16.

In step 106, the service center 42 provisions a customer site associated line, and a customer profile is provisioned or created in response to customer guidelines.

In step 108, the customer initiates setup of the customer site by proceeding to install the customer premises equipment 30. An initial customer allowable transmission rate is established.

In step 110, a technician initiates setup of the customer site 16 by installing the customer premises equipment 30. A customer profile is created in response to the customer guidelines. An initial customer allowable transmission rate is also established.

In step 112, customer information including the customer profile is received from the circuit manager 45.

In step 114, the customer profile monitor 50 monitors, for example, four customer performance parameters including margin, capacity, code violation, and error seconds. The customer profile monitor 50 may utilize software such as ADSL engineering performance tool (ADEPT) software, to retrieve the customer performance parameters from the customer premises equipment 30. In one embodiment of the present disclosure, the customer performance parameters are monitored during off-peak hours such as each evening.

In step 118, an input line file or a deferred line file is received. The input line file is received containing an input line table for many customer site lines from the order system 44. The deferred line file is reviewed from step 126 below. The line table is utilized by the comparator 52 in evaluating customer performance parameters.

In step 120, the main controller retrieves a customer profile for the customer site of interest.

In step 122, the main controller 32 compares the customer profile with standard profiles. When the customer profile matches a standard profile, step 124 is performed, otherwise an error is generated and the main controller 32 reverts back to step 118.

In step 124, each line in the line table is reviewed. A virtual channel and a virtual path are determined for each line.

In step 126, the comparator 52 compares the customer performance parameters with the customer performance standards, for each line, to generate the customer difference signal. A customer performance standard exists for each customer performance parameter including an operating code standard, a signal-to-noise ratio standard, a line capacity standard, an attenuation standard, and an error rate standard. For example, signal-to-noise ratio associated with a customer site 16 is compared with a noise margin profile code to determine whether a violation has occurred. When a customer site line is busy, a deferred line file is generated and the main controller 32 reverts to step 118. When a violation has occurred, an associated line is marked. When a violation does not exist the main controller 32 returns to step 100, to retrieve a customer order, or step 118, to recheck the customer performance parameters. A customer site line may be deleted or removed including an associated virtual channel and a virtual path when the line is no longer in service.

In step 128, when a line is marked, the customer profile adjuster 54 modifies the corresponding customer profile remotely in response to the customer difference signal. When the customer difference signal is above a predetermined value or a customer performance standard has been exceeded, the customer profile is adjusted. For example, when the signal-to-noise ratio margin is less than 6 db with error seconds, corresponding to a difference signal being above a predetermined value, than the customer profile adjuster reduces the customer allowable transmission rate. In another example, when the customer site 16 is experiencing a large amount of data errors, such that the error rate is above a predetermined value, the customer allowable transmission rate may be reduced to minimize the amount of data errors.

In step 130, a newly created customer profile is activated. The customer premises equipment installation is complete. Also, upon adjusting the customer profile the associated customer site line where a violation occurred is removed from the line table along with the virtual channel and virtual path corresponding to that line. The customer profile is reset and a newly created profile is activated. The main controller 32 proceeds to return to step 100.

The customer profile adjuster 54 may increase a customer allowable transmission rate with the remote terminal 16 when the customer performance parameters remain less than (well within) the corresponding customer performance standards for a predetermined amount of time.

The customer site 16 may generate a customer allowed transmission rate adjustment request signal to increase or decrease the customer allowable transmission rate. The main controller 32 may adjust the customer allowed transmission rate in response to the customer allowed transmission rate adjustment request signal.

The above-described steps are meant to be an illustrative example, the steps may be performed synchronously or in a different order depending upon the application.

A particular embodiment of the present disclosure provides an adaptive operating system that is capable of remotely adjusting a customer profile including a customer allowable transmission rate. The particular embodiment of the present disclosure thereby minimizes and potentially eliminates a need for truck rolls to install customer premises equipment or to adjust a customer profile. The particular embodiment of the present disclosure also maximizes transmission of communication signals between customer sites and central offices while minimizing noise and error rate.

The above-described apparatus, to one skilled in the art, is capable of being adapted for various purposes and is not limited to the following systems: telecommunication systems, DSL systems, high-speed data transmission systems; or other communication systems. The above-described disclosure may also be varied without deviating from the spirit and scope of the disclosure as contemplated by the following claims.

What is claimed is:

1. A method comprising:
  receiving, at a controller of a remote terminal, at least one performance parameter detected by a particular customer premises equipment, wherein the remote terminal is distinct from the particular customer premises equipment;
  storing, at the controller of the remote terminal, the at least one performance parameter for the particular customer premises equipment as a performance parameter entry in a line table, wherein the performance parameter entry in the line table is associated with a corresponding performance parameter standard;
  performing, at the controller of the remote terminal, a first comparison of the performance parameter entry with the corresponding performance parameter standard; and
  adjusting, at the controller of the remote terminal, a customer profile for the particular customer premises equipment in response to determining, based on the first comparison, that the performance parameter entry does not satisfy the corresponding performance parameter standard.

2. The method of claim 1, further comprising sending the customer profile from the controller to the particular customer premises equipment for activation by the particular customer premises equipment.

3. The method of claim 1, further comprising:
  performing a second comparison of the customer profile for the particular customer premises equipment to a standard profile before performing the first comparison; and
  generating an error in response to determining, based on the second comparison, that the customer profile does not match the standard profile.

4. The method of claim 1, wherein the at least one performance parameter includes at least one of a signal-to-noise ratio, a line capacity, an attenuation value, an operating code, and an error rate.

5. The method of claim 1, wherein adjusting the customer profile for the particular customer premises equipment includes reducing a customer allowable transmission rate in the customer profile in response to determining, based on the first comparison, that the performance parameter entry indicates substandard performance in relation to the corresponding performance parameter standard, and adjusting the customer profile for the particular customer premises equipment includes increasing the customer allowable transmission rate in the customer profile in response to determining, based on the first comparison, that the performance parameter entry is above the corresponding performance parameter standard for a predetermined amount of time.

6. The method of claim 1, further comprising removing from the line table the performance parameter entry in response to determining, based on the first comparison, that the performance parameter entry does not satisfy the corresponding performance parameter standard.

7. The method of claim 1, wherein the controller is coupled to the particular customer premises equipment by a digital subscriber line, and wherein the line table is associated with the digital subscriber line.

8. A system comprising:
  a transceiver of a remote terminal configured to be communicatively coupled by a digital subscriber line to a particular customer premises equipment at a customer site, wherein the remote terminal is distinct from the particular customer premises equipment; and
  a controller of the remote terminal coupled to the transceiver;
  wherein the controller is configured to monitor, via the transceiver, at least one performance parameter received from the particular customer premises equipment that detects the at least one performance parameter;
  wherein the controller is configured to compare the at least one performance parameter to at least one corresponding performance standard; and
  wherein the controller is configured to send an adjusted customer profile to the particular customer premises equipment for activation of the adjusted customer profile by the particular customer premises equipment, wherein the adjusted customer profile is sent based on determining that the at least one performance parameter does not satisfy the at least one corresponding performance standard.

9. The system of claim 8, wherein the controller includes a profile monitor to monitor the at least one performance parameter for the digital subscriber line.

10. The system of claim 8, wherein the controller includes a comparator to compare the at least one performance parameter to the at least one corresponding performance standard.

11. The system of claim 10, wherein the comparator utilizes a line table that includes the at least one performance parameter for the particular customer premises equipment.

12. The system of claim 11, wherein the controller is configured to modify a customer profile for the particular customer premises equipment to form the adjusted customer profile based on determining that the at least one performance parameter does not satisfy the at least one corresponding performance standard and is configured to delete a lines from the line table that correspond to the at least one performance parameter that do not satisfy the at least one corresponding performance standard.

13. The system of claim 8, wherein the controller includes a profile adjuster to change the adjusted customer profile to adjust the at least one performance parameter to satisfy the at least one corresponding performance standard over a predetermined period of time.

14. The system of claim 8, wherein the at least one performance parameter includes at least one of a signal-to-noise ratio, a line capacity, an attenuation value, an operating code, and an error rate.

15. A method comprising:
- detecting, at a particular customer premises equipment, performance parameter for a digital subscriber line of the particular customer premises equipment;
- sending, from the particular customer premises equipment, the performance parameter to a remote terminal that is distinct from the particular customer premises equipment;
- receiving, at the particular customer premises equipment, a customer profile from the remote terminal, wherein the customer profile specifies a customer allowable transmission rate based on a first determination by the remote terminal that the performance parameter does not satisfy a corresponding performance standard; and
- activating, at the particular customer premises equipment, the customer profile.

16. The method of claim 15, wherein the customer allowable transmission rate of the customer profile is reduced from a default transmission rate.

17. The method of claim 15, wherein the customer allowable transmission rate of the customer profile is increased from a default transmission rate based on a third determination by the remote terminal that the performance parameter is above the corresponding performance parameter standard for a predetermined amount of time.

18. The method of claim 15, further comprising sending, to the remote terminal, a request to adjust the customer allowable transmission rate of the customer profile.

19. The method of claim 15, wherein detecting the performance parameter is performed during off-peak hours.

20. The method of claim 15, wherein the performance parameter includes at least one of a signal-to-noise ratio, a line capacity, an attenuation value, an operating code, and an error rate.

* * * * *